United States Patent [19]
Hulyalkar

[11] Patent Number: 5,512,957
[45] Date of Patent: Apr. 30, 1996

[54] METHOD AND APPARATUS FOR COMBATING CO-CHANNEL NTSC INTERFERENCE FOR DIGITAL TV TRANSMISSION

[75] Inventor: Samir N. Hulyalkar, White Plains, N.Y.

[73] Assignee: Philips Electronics North America Corp., New York, N.Y.

[21] Appl. No.: 230,360

[22] Filed: Apr. 20, 1994

Related U.S. Application Data

[63] Continuation-in-part of Ser. No. 197,773, Feb. 10, 1994.

[51] Int. Cl.[6] .................................................. H04N 5/455
[52] U.S. Cl. ..................... 348/607; 348/21; 375/350; 455/296
[58] Field of Search ................................... 348/607, 726, 348/608, 21, 611, 409, 618; 455/296, 308, 63; 375/99, 102, 103; H04N 5/38, 5/455

[56] References Cited

U.S. PATENT DOCUMENTS

| | | | |
|---|---|---|---|
| 3,652,992 | 3/1972 | Koll | 340/146.3 |
| 4,833,693 | 5/1989 | Eyuboglu | 375/99 |
| 4,965,789 | 10/1990 | Bottau et al. | 348/411 |
| 5,086,340 | 2/1992 | Citta et al. | 358/141 |
| 5,087,975 | 2/1992 | Citta et al. | 358/183 |
| 5,121,203 | 6/1992 | Citta | 358/141 |
| 5,181,112 | 1/1993 | Citta et al. | 348/608 |
| 5,325,188 | 6/1994 | Scarpa | 375/103 |
| 5,349,589 | 9/1994 | Chennakeshu et al. | 371/43 |

OTHER PUBLICATIONS

Eyuboglu et al., "Trellis Precoding: Combined Coding, Precoding and Shaping for Intersymbol Interference Channels", IEEE Trans. on Info. Theory, vol. 38, No. 3, Mar. 1992, pp. 301–314.
Forney, "Trellis Shaping", IEEE Trans. on Info. Theory, vol. 38, No. 2, Mar. 1992, pp. 281–300.
Heegard et al., "Practical Coding for QAM Transmission of HDTV", IEEE Journal on Selected Areas in Comm., vol. 11, No. 1, Jan. 1993, pp. 111–118.
Ungerboeck, "Channel Coding with Multilevel/Phase Signals", IEEE Trans. on Info. Theory, vol. IT–28, No. 1, Jan. 1982, pp. 55–67.
Wei, "Precoding Technique for Partial–Response Channels with Applicaiotns to HDTV Transmission", IEEE Journal on Selected Areas in Comm., vol. 11, No. 1, Jan. 1993, pp. 127–135.
Eyuboglu, "Detection of Coded Modulation Signals on Linear, Severly Distorted Channels Using Decision–Feedback Noise Prediction with Interleaving", IEEE Trans. on Comm., vol. 36, No. 4, Apr. 1988, pp. 401–409.
Tomlinson, "New Automatic Equaliser Employing Modulo Arithmetic", Electronics Letters, Mar. 25, 1971, vol. 7, Nos. 5/6, pp. 138–139.
Harashima et al., "Matched–Transmission Technique for Channels With Inter–symbol Interference", IEEE Trans. on Comm., vol. COM–20, No. 4, Aug. 1972, pp. 774–779.
"Advanced Digital Television: System Description", Jan. 20, 1992, Philips Laboratories.
"VSB Transmission System Zenith Electronics Corporation", Dec. 17, 1993, Technical Details.
"Technical Details—Digital Spectrum Compatible", Zenith, Sep. 23, 1991.
"Summary Description of Terrestrial and Cable Bakeoff Systems", General Instruments, Jan. 17, 1994.
"Digicipher HDTV System Description", General Instrument Corporation, Aug. 22, 1991.
"Channel Compatible Digicipher HDTV System", Massachusetts Institute of Technology, Apr. 3, 1992.

*Primary Examiner*—James J. Groody
*Assistant Examiner*—Jeffrey S. Murrell
*Attorney, Agent, or Firm*—Michael E. Marion

[57] ABSTRACT

An ATV receiver having a decoder which is designed to process a subset limited trellis pre-coded television signal. The decoder processes co-channel interference so as to produce at the filter output of a rejection filter, a residual interference spectrum which is as flat as possible. The filter exploits the fact that only the picture and the sound carriers need to be sufficiently attenuated and cancels NTSC co-channel interference with only a small degradation in performance when AWGN is also present.

9 Claims, 13 Drawing Sheets

METHOD AND APPARATUS FOR COMBATING CO-CHANNEL NTSC INTERFERENCE FOR DIGITAL TV TRANSMISSION

This application is a continuation in part of U.S. patent application Ser. No. 08/197,773 filed on Feb. 10, 1994, (PHA 21-869), which is incorporated by reference herein.

BACKGROUND OF THE INVENTION

The Federal Communications Commission and cable television testing organizations such as CableLabs have been evaluating digital television delivery systems in order to choose a new television "standard" which someday will replace NTSC in the United States. These systems all involve digital coding and data compression techniques, for example those utilizing the MPEG digital coding algorithms or variations thereof.

The FCC plans to test and approve an advanced television (ATV) standard in 1994 comprising for example, high definition television (HDTV) and standard definition (SDTV) digital signals for terrestrial broadcasting. Although the specifics of the standard are yet to be fully tested and agreed upon, the FCC has indicated that the system will initially take the form of a so called "simulcast" approach. The new ATV signals will have to fit into currently unused television channels (so-called "taboo" channels) and initially co-exist with conventional analog television signals without co-channel interference.

NTSC will be used hereinafter to represent one example of conventional television broadcasting. Other examples would be SECAM and PAL. Although NTSC is exemplified herein, it is not meant to be construed as a limitation and will be used herein synonymously with "conventional" to represent conventional television in general.

In 1994 the FCC will test the so-called "Grand Alliance" system, a system which is being cooperatively developed by the corporate sponsors which developed the first round of individual proposals which were tested by the FCC in 1991 and 1992. This system proposes to take the best features from those systems already tested in order to present a single optimum system for FCC approval as the U.S. standard.

The Grand Alliance has decided on a coding algorithm which will comply with the source coding standards proposed by MPEG (Motion Pictures Experts Group). In addition, an RF transmission approach developed by Grand Alliance member Zenith Electronics Corporation was selected by the Grand Alliance. Zenith utilizes a multi-level vestigial sideband (VSB) modulation approach which is described in "Digital Spectrum Compatible—Technical Details", Sep. 23, 1991 and in "VSB Transmission System: Technical Details", Dec. 17, 1993. Both of these publications are incorporated by reference herein.

The parent application from which the instant application depends, describes an improved approach to combatting co-channel interference which utilizes a generalized "rejection" filter at the receiver instead of the comb filter proposed by Zenith, and a generalized pre-coder at the transmitter. This approach solves a number of problems and improves performance when both co-channel NTSC and additive white Gaussian noise (AWGN) are present. The improved performance of the system is however, at the expense of some performance when only AWGN is present (e.g. 0.3 dB for a 36-tap filter). This loss in performance is due to the fact that the NTSC rejection filter is implemented at the decoder which causes noise enhancement because the noise also passes through the NTSC rejection filter.

A method for using a generalized pre-coder and a corresponding decoder for the case when uncoded QAM/VSB modulation is used, is described in "New Automatic Equalizer Employing Modulo Arithmetic", Electronic Letters, pp. 138–139, March 1971, by M. Tomlinson and in "Matched-Transmission Technique for Channels With Intersymbol Interference", IEEE Transactions on Communications, vol. COM-20, no. 4, pp. 774–780, August 1972, by H. Harashima and H. Miyakawa, which are incorporated by reference herein.

The implementation of a pre-coder along with a trellis encoder and the corresponding decoder is described in "Trellis Precoding: Combined Coding, Precoding and Shaping for Intersymbol Interference Channels", IEEE Transactions on Information Theory, vol. 38, no. 2, pp. 301–314, March 1992, by M. V. Eyuboglu and G. D. Forney, which is incorporated by reference herein. In this paper, it is shown that the asymptotic coding gain of the trellis code is unchanged when a pre-coder is used with the corresponding decoder for this case. The performance of a concatenated coding approach of using an outer RS (Reed-Solomon) encoder and an inner trellis encoder is dependent however, on the performance at larger error probabilities and not on asymptotic performance, as shown for example in "Practical Coding for QAM Transmission of HDTV" IEEE Journal on Selected Areas in Communications, vol 11, no. 1, pp. 111–118, January 1993, by C. Heegard, S. Lery and W. Paik, which is incorporated by reference herein.

Because the input to the Grand Alliance HDTV transmission system is an MPEG packet of 188 bytes, an RS code with parameters (208,188,10), which is a 10 byte error-correcting code, was chosen to be used with the Zenith approach. This choice is reasonable given the ease of implementation of implementing a RS decoder for byte-correction capability of up to 10–12 bytes.

TOV stands for the "threshold of visibility" of errors seen at the output of the MPEG decoder. Simulations have indicated that when a pre-coder designed to be used with a 36-tap rejection filter at the receiver, was used at the transmitter, the loss in TOV performance at RS packet-error rates of $6 \times 10^{-4}$ was 0.9 dB using RS (208,108,10) and the trellis encoder proposed by Zenith. This significantly more than the predicted loss of 0.3 dB. In fact, in this case, even the asymptotic performance was degraded significantly.

In the original trellis-coding paper "Channel Coding with Multilevel/Phase Signals", IEEE Transactions on Information Theory, vol. IT-28, no. 1, pp. 55–67, January 1982, by G. Ungerboeck, which is incorporated by reference herein, it was shown that the asymptotic performance of a trellis code is dependent either on the minimum distance between the signal points in a subset of the entire constellation (which is chosen in a particular way using a "set-partitioning" approach), or on the minimum distance path in the trellis corresponding to the convolutional code used within the trellis code. This trellis code dependent on the minimum distance of the subset of the entire constellation will be formed "subset-limited", while the trellis code dependent on the minimum distance path in the trellis will be termed "code-limited".

When the Zenith trellis code (which is "code-limited") is used, the pre-coder causes the trellis decoder to use subsets in an expanded constellation as described in "Trellis Pre-coding: Combined Coding, Precoding and Shaping for Intersymbol Interference Channels". The use of the expanded constellation changes the distance structure of the trellis corresponding to the convolutional code and thus causes a significant loss in performance for the case when a "code-limited" trellis code, for example, the Zenith trellis code, is used.

In the Zenith approach, a comb filter is used at the receiver to alleviate co-channel NTSC interference. At the transmitter, a 4-state trellis code with 8VSB modulation is used. It is then possible to treat the comb filter as a partial response channel in cascade with the 4-state trellis code and develop a Viterbi decoding strategy on an expanded trellis, the states of which correspond to the cascade of the states of the comb-filter and the trellis coder. This is explained in some detail in "VSB Transmission System: Technical Details". Clearly, these states are dependent on the comb filter.

If a switch is made at a packet boundary of the MPEG data stream to transmit, for example, a 4-state trellis code with 4VSB modulation instead of a 4-state 8VSB trellis code and the comb filter is not present, the same decoder is able to decode the 4-state 4VSB scheme, without causing any disruption at the boundary bits, if the same 4-state trellis code is used. If however, the comb filter is on, the switch between the expanded state 8VSB decoder to a four-state 4VSB decoder is not smooth. The memory introduced by the comb filter will cause degradation of performance at the boundary.

While it is possible to prevent this degradation by using a "dead" time in which symbols which are already known to the decoder are sent, this "dead" time must be greater than the memory of the comb filter, which has a memory of 12 symbols. This implies that after the transmission of every packet, at least 12 symbols with no particular purpose must be sent, which is an overhead of 1.4%.

SUMMARY OF THE INVENTION

The instant invention comprises a "trellis-precoding" system which exhibits a very small loss in TOV performance when an NTSC rejection filter is used in the receiver for eliminating co-channel interference and only AWGN is present. The "trellis-precoding" system uses a trellis code which is "subset-limited".

It is easily seen that the expanded constellation that results due to the use of a pre-coder does not change the minimum distance between the signal points in a subset and hence a "subset-limited" trellis code will perform much better than a "code-limited" trellis code.

The instant invention also comprises the use of "trellis-precoding" which forces the expanded constellation points to have very few values beyond the original constellation. For the 36-tap filter discussed in the parent application, the expanded constellation has only two extra points as compared to the original constellation with at least 99% probability. Trellis-precoding does not increase the complexity of the decoding; it provides the coding gain at the expense of complexity in the transmitter. In a broadcast scenario, this is desirable since the number of transmitters will be much smaller than the number of receivers.

The "trellis-precoding" used in a preferred embodiment of the instant invention allows the transmission of different data streams at different transmission rates with different reliability. This may be important if broadcasters want to send data as well as compressed HDTV over the same channel. For example such auxiliary data might be targeted for mobile reception and therefore would require more reliability. In the MPEG transport layer, a priority bit is present which can be used to decide whether a particular packet is sent with higher reliability or not. The "trellis-precoding" method of the instant invention allows for multiple levels of priority, with no additional overhead. The preferred embodiment described herein implements two levels of priority and hence is described herein as "bi-rate" coding.

An additional feature of the invention is that the "trellis-precoding" method allows for "bi-rate" coding without adding any additional overhead than what already exists in the Zenith system as described in "VSB Transmission System: Technical Details".

A further feature of the invention is that a more optimal decoding strategy using MAP (maximum a posteriori) decoding can be used for the "trellis-precoding" system, which provides some improvement over usual ML (maximum-likelihood) decoding.

DETAILED DESCRIPTION OF PREFERRED EMBODIMENTS OF THE INVENTION

Figure 1:
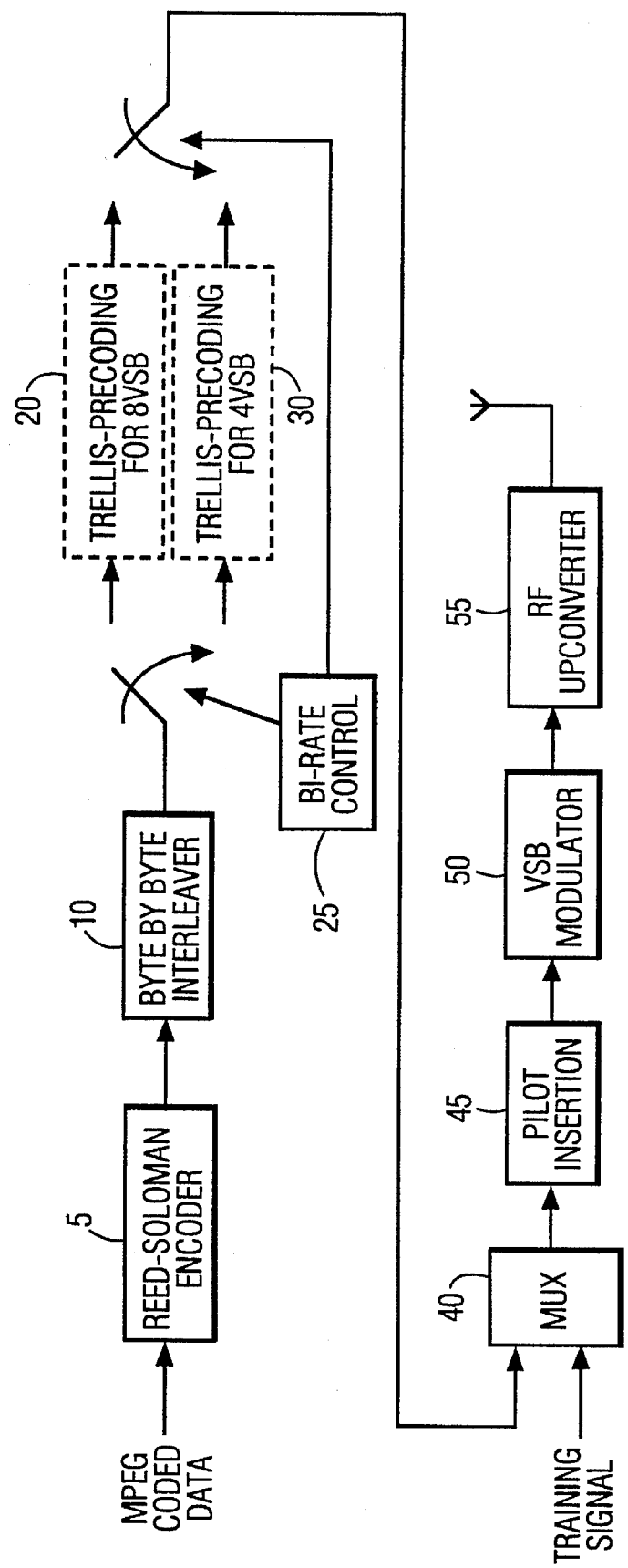
FIG. 1 shows the block diagram of a VSB transmitter comprising the invention.

FIG. 1 describes an encoding/transmission system comprising the invention. Digital data (for example MPEG encoded television) to be transmitted or recorded using a transmission path (for example an HDTV television channel or a record carrier) is passed through the Reed-Solomon (RS) encoder 5 and the byte interleaver 10. These blocks are well-known and described, for example, in "VSB Transmission System: Technical Details".

The "bi-rate" control block 25 decides whether 8VSB or 4VSB modulation is to be used. If 8VSB modulation is to be used then the "trellis-precoding" block 20 for 8VSB is used. Otherwise the "trellis-precoding" block 30 for 4VSB is used. The operation of both of these blocks will be explained in more detail below in connection with in FIGS. 4 and 6. The "bi-rate" coding can be implemented in accordance with the invention without adding any additional overhead to the basic Zenith system described in "VSB Transmission System: Technical Details".

The output of the either "trellis-precoder" is passed through a multiplexer (MUX) 40 which also multiplexes any training signals that are present. The multiplexed stream is then appropriately modified to insert a pilot signal shown by 45, which is then passed through a VSB modulator 50 and the RF upconverter 55 after which it is radiated over the HDTV terrestrial channel. All the blocks 40, 45, 50, 55 are described in "VSB Transmission System: Technical Details" as well as "Digital Spectrum Compatible—Technical Details".

Figure 2:
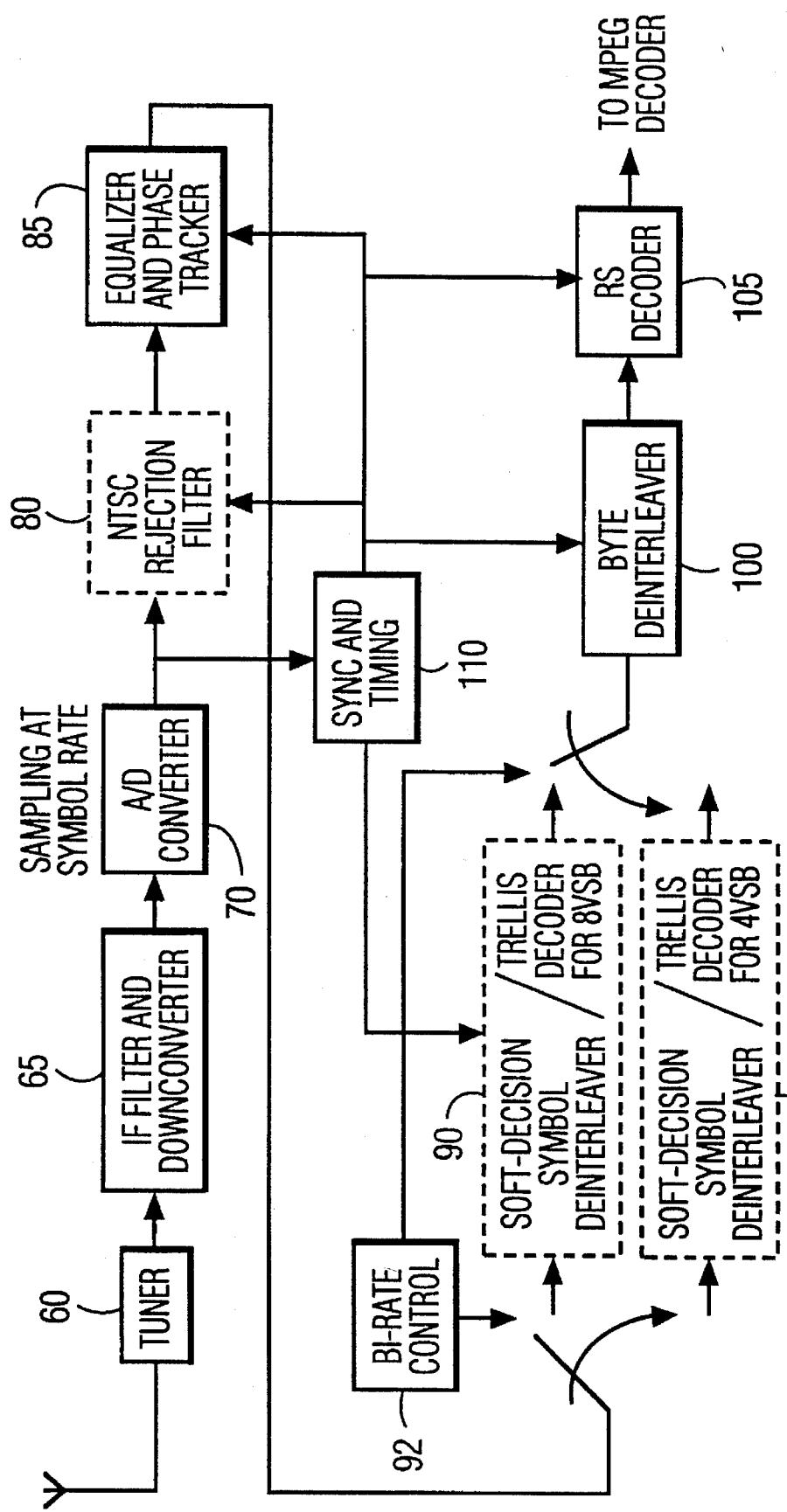
FIG. 2 describes a VSB receiver comprising the invention.
Figure 3:
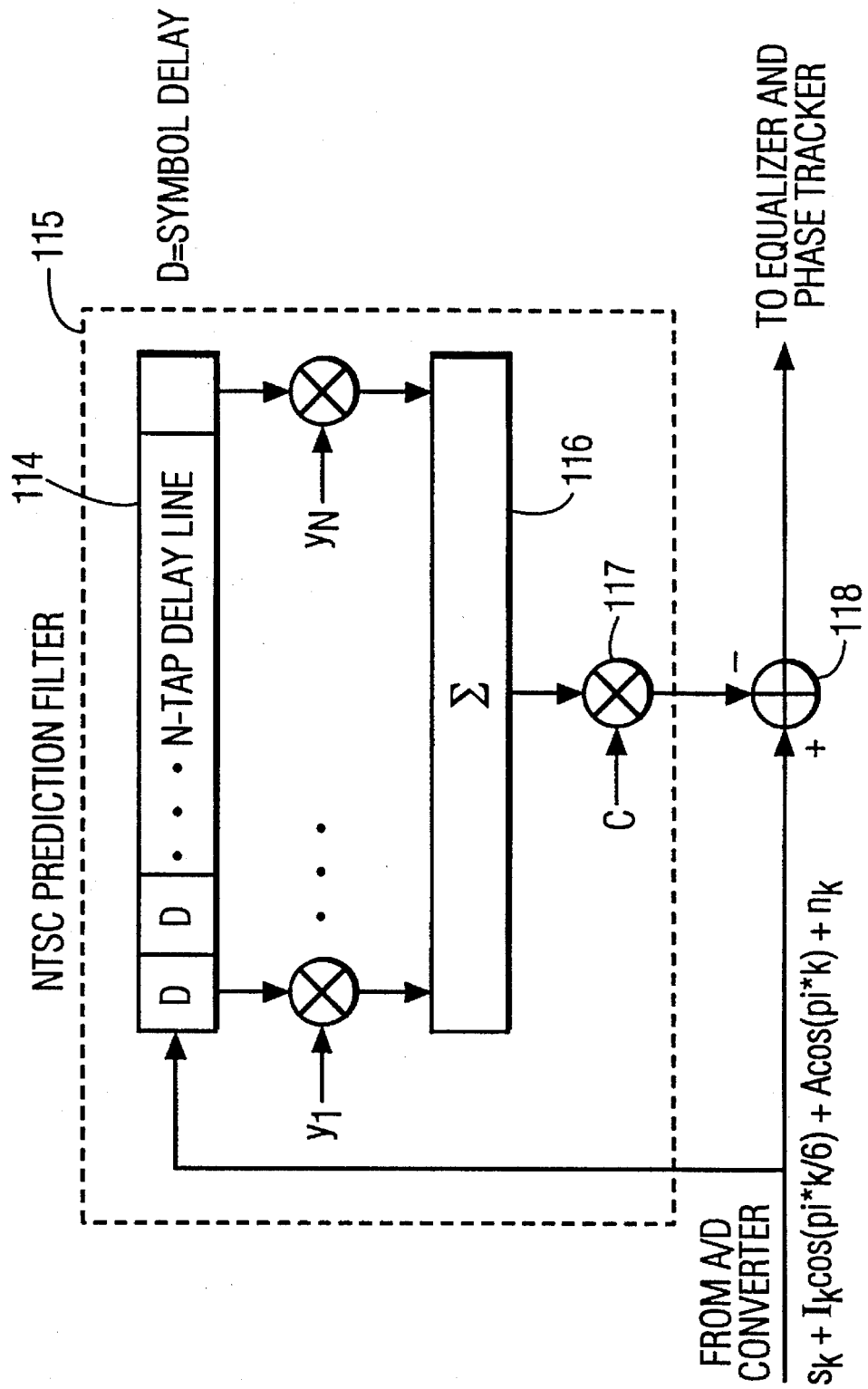
FIG. 3 describes an interference rejection filter comprising the invention.

FIG. 2 describes the block diagram of a VSB receiver comprising the invention. The tuner 60 selects the HDTV channel of interest and converts the received signal from RF to IF. IF filter and downconverter 65 comprises a SAW filter, which shapes the signal spectrum according to the filter used The NTSC interference rejection filter 80 is described in FIG. 3. It consists of an NTSC prediction filter 115, which provides estimates on the deterministic parts of interfering NTSC signal, the output of which is then subtracted out of the main signal by using the subtracter 118. The NTSC prediction filter 80 consists of an N-tap delay line 114, where each delay is equal to one symbol interval, which is the reciprocal of the A/D sampling rate of 10.76 MHz.

After summing the output of the delay line 114 multiplied by the coefficients $Y_1 \ldots Y_N$ of the NTSC prediction filter 80, the delay line output multiplied by a final scaling constant C operating on the sum provides the output of the NTSC prediction filter 80. The design of the NTSC prediction filter 80 is treated in some detail in the parent application.

TABLE I

24-Tap NTSC Prediction Filter with Tap Values Either +1 or −1. Other Taps are Zero.
Constant C= 0.1 (=1/10). Loss in AWGN Performance = 0.5 dB,
Picture Carrier Attenuation = −25 dB,
Sound Carrier Attenuation = −14 dB.

| Tap Number | 2 | 5 | 6 | 7 | 10 | 12 | 14 | 17 | 18 | 19 | 21 | 24 |
|---|---|---|---|---|---|---|---|---|---|---|---|---|
| Tap Value | +1 | −1 | −1 | −1 | +1 | +1 | +1 | −1 | −1 | −1 | +1 | +1 |

TABLE II

36-Tap NTSC Prediction Filter with Tap Values Either+1 or −1. Other Taps are Zero. Constant C = 0.0625 (=1/16).
Loss in AWGN Performance = 0.3 dB, Picture Carrier Attenuation = −18 dB, Sound Carrier Attenuation = −12 dB.

| Tap Number | 2 | 5 | 6 | 7 | 10 | 12 | 14 | 17 | 18 | 19 | 22 | 24 | 26 | 29 | 30 | 31 | 34 | 36 |
|---|---|---|---|---|---|---|---|---|---|---|---|---|---|---|---|---|---|---|
| Tap Value | +1 | −1 | −1 | −1 | +1 | +1 | +1 | −1 | −1 | −1 | +1 | +1 | +1 | −1 | −1 | −1 | +1 | +1 | in VSB modulator 50, followed by a mixer which downconverts it to a baseband signal. The operation of tuner 60 and IF filter and downconverter 65 is explained in detail in "Digital Spectrum Compatible—Technical Details".

The analog-to-digital (A/D) converter 70 samples the baseband signal at symbol-rate (which for the Zenith system) is 10.76 MHz. The NTSC rejection filter 80, described in more detail in FIG. 3, then processes this sampled signal and passes it to the equalizer and phase tracker 85 which is described in more detail in the parent application.

The bi-rate control block 92 decides between 8VSB or for 4VSB for the trellis-decoding. For the 8VSB case, the sampled signal is coupled to combined trellis-decoder and soft-decision symbol deinterleaver 90. For the 4VSB case a similar combined trellis-decoder and soft-decision symbol deinterleaver 95 is used. The operation of both trellis-decoder and soft-decision symbol interleavers 90 and 95 are described in more detail below in conjunction with FIGS. 10 and 11. The output of either of trellis-decoder and soft-decision symbol de-interleavers 90 and 95 is then passed through byte deinterleaver 100 and RS decoder 105 which are described in "VSB Transmission System: Technical Details".

The sync and timing block 110 controls the clocking for bi-rate control 92, trellis-decoder and soft-decision symbol de-interleavers 90 and 95, byte deinterleaver 100 NTSC rejection filter 80, equalizer and whose tracker 85, RS decoder 105 and A/D converter 70.

Tables I and II list 24-tap and 36-tap NTSC prediction filters are listed which utilize coefficients with values in the set $\{-1, 0, +1\}$.

As discussed in the parent application, the transmitted signal must be pre-coded in a precoder implemented in the transmitter if it is to be processed by NTSC rejection filter 80. When uncoded VSB/QAM is used, the technique as described in "New Automatic Equalizer Employing Modulo Arithmetic", and in "Matched-Transmission Technique for Channels With Intersymbol Interference" can be also be used. However, as explained earlier, with trellis coding, these techniques do not provide the best TOV performance and the "trellis-precoding" approach discussed above in conjunction with trellis precoders 20 and 30, must be used. Trellis precoding is described in "Trellis Precoding: Combined Coding, Precoding and Shaping for Intersymbol Interference Channels".

The choice of the trellis-code is guided by the principles outlined earlier, for example, a "subset-limited" trellis-code is used which allows "bi-rate" coding.

Figure 4:
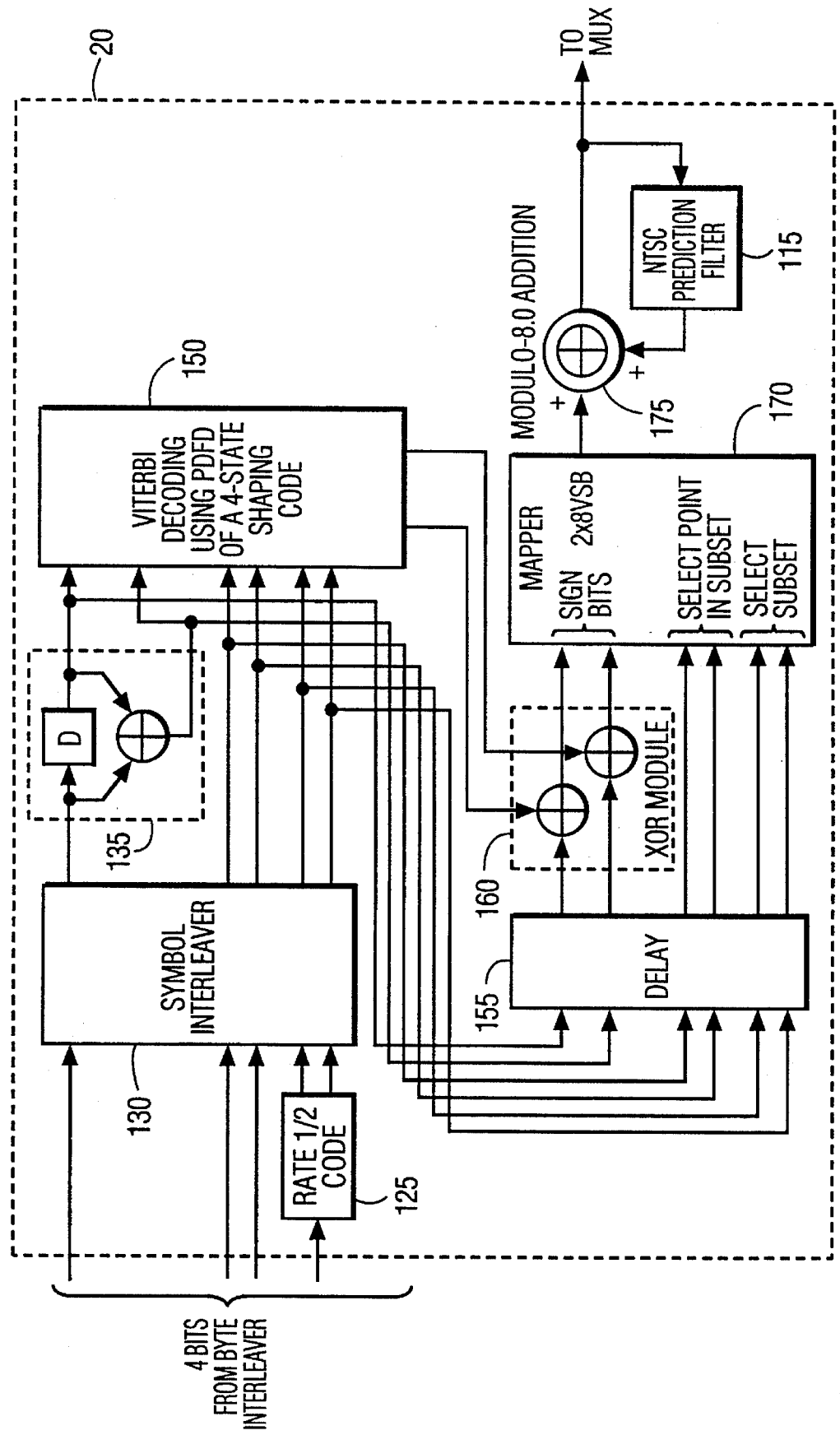
FIG. 4 describes a trellis-precoding system comprising the invention which uses 8VSB modulation.
Figure 5:
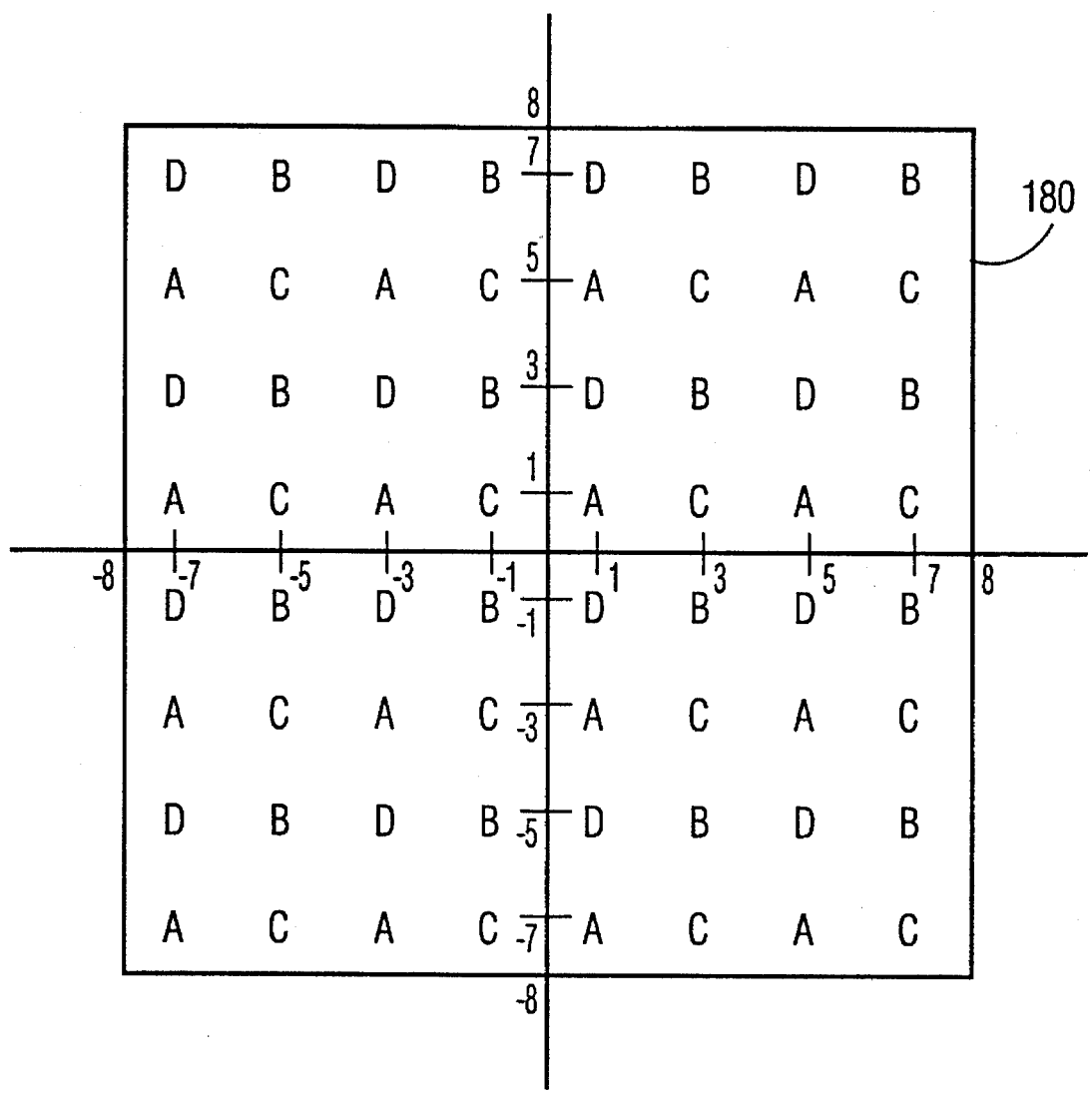
FIG. 5 describes the mapping of subsets onto the 2×8VSB signal constellation.

FIG. 4 describes the "trellis-precoding" system for 8VSB modulation. Four bits from every byte output by the byte interleaver 10 are input to the "trellis-precoder" as shown. One of these four bits is processed using a rate ½ convolutional code processor 125, the code-vectors of which are based on the codes described in "Channel Coding with Multilevel/Phase Signals". These codes are tabulated in terms of the number of states in the trellis description of the convolutional code. For this implementation a choice of an 8-state convolutional code is made, although higher or lower number of states in the convolutional code processor 125 can also be used. What is more important is that these coded bits select a subset among four subsets designated as 'A', 'B', 'C' and 'D' as shown in FIG. 5.

The two coded bits at the output of the convolutional code processor 125, along with the other three uncoded bits are then sent through a symbol interleaver 130, which treats the set of five bits as one symbol. The symbol interleaver 130 can be implemented as a block interleaver or as a convolutional interleaver. Both implementations are described in U.S. Pat. No. 3,652,998 which is incorporated by reference herein.

One of these uncoded bits at the output of the symbol interleaver 130 is passed through the shaping module 135 as shown, which calculates the "shaping bits" for a four-state shaping code as described in "Trellis Precoding: Combined Coding, Precoding and Shaping for Intersymbol Interference Channels". The shaping module selects the sequence of bits to be output from mapper 170 so as to minimize the average energy, thus providing the same error performance with less energy. This reduces the SNR. The outputs of the symbol interleaver and shaping module 135 are then sent to a Viterbi decoder 150 which implements PDFD (parallel decision feedback decoding) using the NTSC interference rejection filter. Effectively this decoder selects those points in the 2×8VSB constellation which provides lower output average power among all the possibilities that it is presented while decoding a four-state convolutional code. The method of implementing the Viterbi decoder 150 using PDFD is described in detail in "Trellis Precoding: Combined Coding, Precoding and Shaping for Intersymbol Interference Channels".

The input to the Viterbi decoder is passed through an appropriate delay 155, such that the Viterbi decoder output can then be used to change the "sign bits" of the 2×8VSB mapper 170 using the EXCLUSIVE OR module 160 as shown.

The mapper 170 maps six bits onto a 2×8VSB constellation (or 64 QAM constellation).

The two coded bits select a subset 'A', 'B', 'C' and 'D' as shown in FIG. 5. The two bits from EXCLUSIVE OR module 160 select the sign bits in each dimension, while the two uncoded bits specify the rest of the constellation points in each dimension. This mapping can be formalized as follows. Effectively, each of the points in the constellation is represented uniquely by an ordered pair (X,Y) where X and Y are one of $\{-7,-5,-3,-1,+1,+3,+5,+7\}$. Now X/8.0 can be represented in a two's complement binary notation as (S.b1b2b3), where S is the sign bit and b1, b2, and b3 represent the magnitude in two's complement. Thus one of the bits from EXCLUSIVE OR module 160 selects the sign bit, one of the uncoded bits selects b1 and one of the coded bits select b2 and b3 is always 1. Thus three bits select X or Y and all the six bits together then select a point in the constellation shown in FIG. 5.

The output of the mapper 170 is passed through a modulo adder 175 as described in "New Automatic Equalizer Employing Modulo Arithmetic". The other input to the modulo adder 175 is from the output of the modulo adder passed through the NTSC prediction filter 115 described in FIG. 3. The modulo-8.0 addition restricts the output of the modulo-adder to be within the square boundary 180 shown in FIG. 5.

Figure 6:
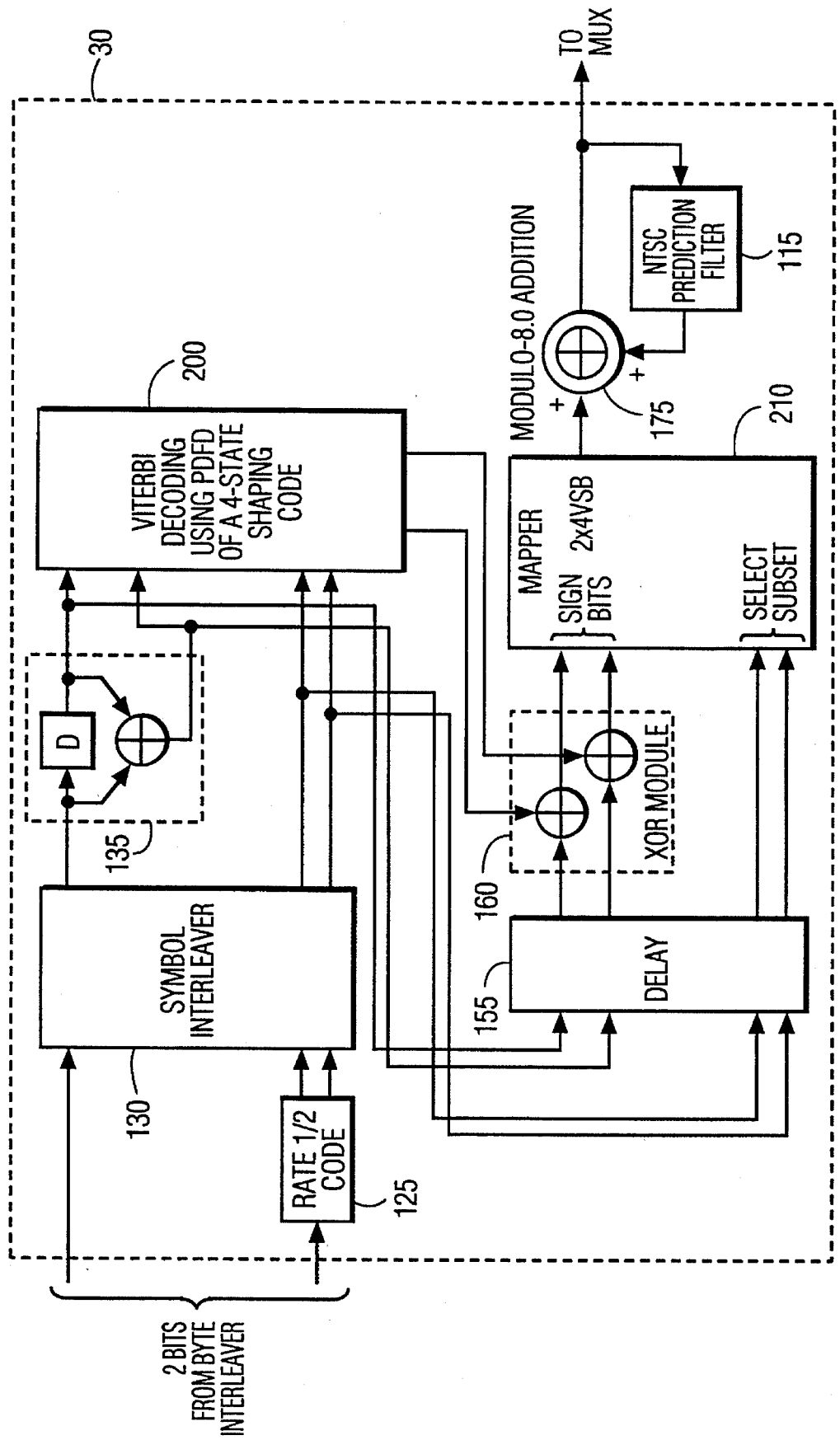
FIG. 6 describes a trellis-precoding system comprising the invention which uses 4VSB modulation.

A similar "trellis-precoding" system is described for the 4VSB case in FIG. 6. In this case, only two bits are input to the "trellis-precoding" system 30. One of these two bits is sent through the rate ½ convolutional code processor 125 which is the same code that is used for the 8VSB "trellis-precoding" system. This part is essential for the error-free transition between the 8VSB and 4VSB decoding strategies at the receiver. The symbol interleaver 130 (also used in FIG. 4) regards the input 3 bits as a symbol as shown. The uncoded bit at the output of the symbol interleaver 130 then goes through the shaper module 135 as shown to create two "shaping bits" which together with the coded bits are input to the Viterbi decoder 200 using PDFD. This Viterbi decoder will be different than the Viterbi decoder 150 used for the 8VSB system, essentially because of a different mapping strategy.

Figure 7:
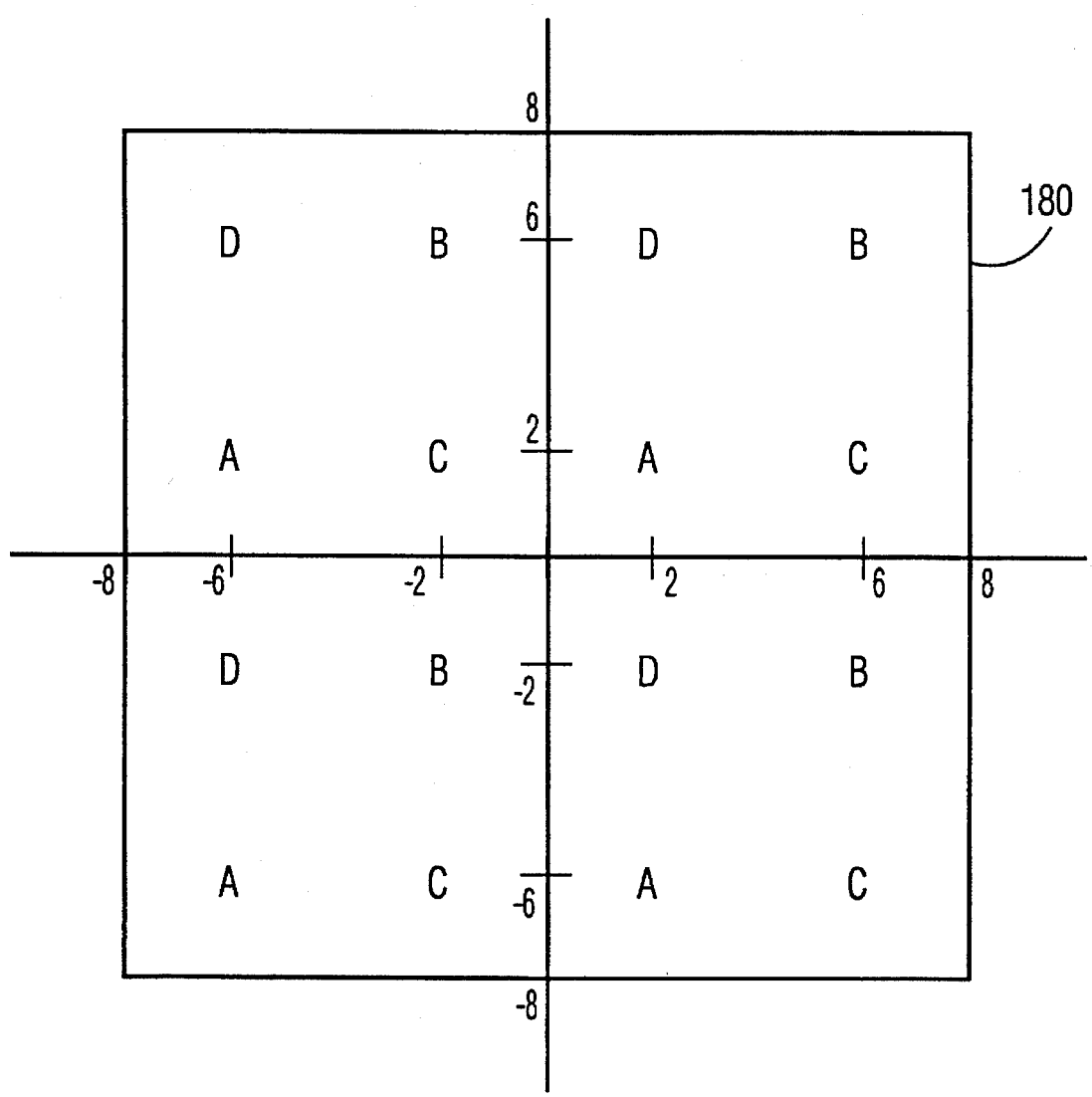
FIG. 7 describes the mapping of subsets onto the 2×4VSB signal constellation.

Similar to the "trellis-precoding" system for 8VSB, the four bits input to the Viterbi decoder 200 are passed through a delay 155 and the EXCLUSIVE OR module 160 as shown. The mapper 210 in this case is different and uses the signal point constellation of 2×4VSB as shown in FIG. 7. The two coded bits select a subset while the two bits from EXCLUSIVE OR module 160 select the sign bits.

Similar to the 8VSB case, if (X,Y) denote any constellation point in the 2×4VSB constellation, then X/8.0 can be represented in two's complement binary notation by (S.b1b2b3) where now S is one of the sign bits, b1 is one of the coded bits, b2 is always 1 and b3 is always 0. Hence four bits can select the constellation point in the 2×4VSB constellation as shown in FIG. 7.

The output of the mapper 210 is passed through the modulo-8.0 adder 175 which has as its other input the output of the NTSC prediction filter 115. This section is the same as that shown in FIG. 4 for the "trellis-precoding" system for 8VSB. Actually, for simplicity of understanding the "trellis-precoding" blocks 20 and 30 for 8VSB and 4VSB are shown to be implemented as different circuits in FIG. 1, however many subsections are common between the two systems and they can both be implemented as a single circuit with appropriate switches used for the two cases.

From FIGS. 5 and 7, the performance difference between the 8VSB modulation and 4VSB modulation can be evaluated. Since, the rate ½ convolutional code processor 125 is the same in both trellis precoding systems (FIGS. 4 and 6), the two codes are "subset-limited". Hence, the performance difference can be approximated by evaluating the difference between the minimum subset distance, which is easily seen to be 6 dB.

The 4VSB system therefore requires an SNR (signal-to-noise-ratio) which is 6 db smaller than the 8VSB system but at the expense of sending only two bits per symbol interval as opposed to sending four bits for the 8VSB case.

The invention comprises a method for indicating at the receiver when either the 8VSB or 4VSB trellis precoders (20 and 30 respectively) are used at the transmitter so that the proper trellis decoder (90 or 95) can be selected.

Figure 8:
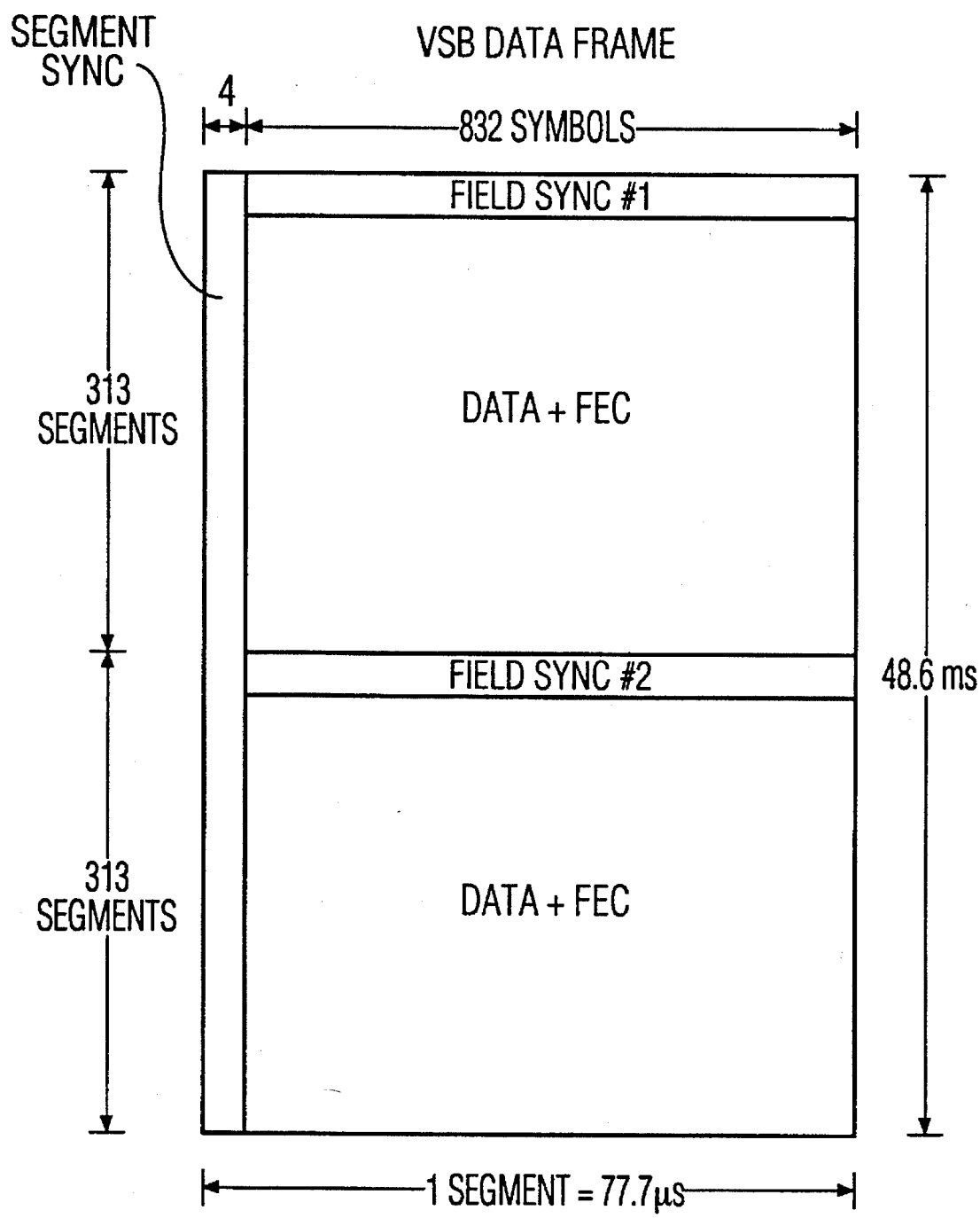
FIG. 8 describes a prior art VSB data frame.

FIG. 8 shows the VSB data frame described in "VSB Transmission System: Technical Details". In this frame, the width of 832 8VSB symbols correspond to exactly 208 bytes which is one MPEG packet of 188 bytes plus an additional 20 parity bytes. If 4VSB modulation is used then an RS coded MPEG packet corresponds to two sets of 832 4VSB symbols. The MPEG transport system specifies that different priorities will be given only to different MPEG packets. Hence, the possibility that either 8VSB or 4VSB modulation may be used, every two segments, or every "pair-segment" must be allowed for.

Figure 9:
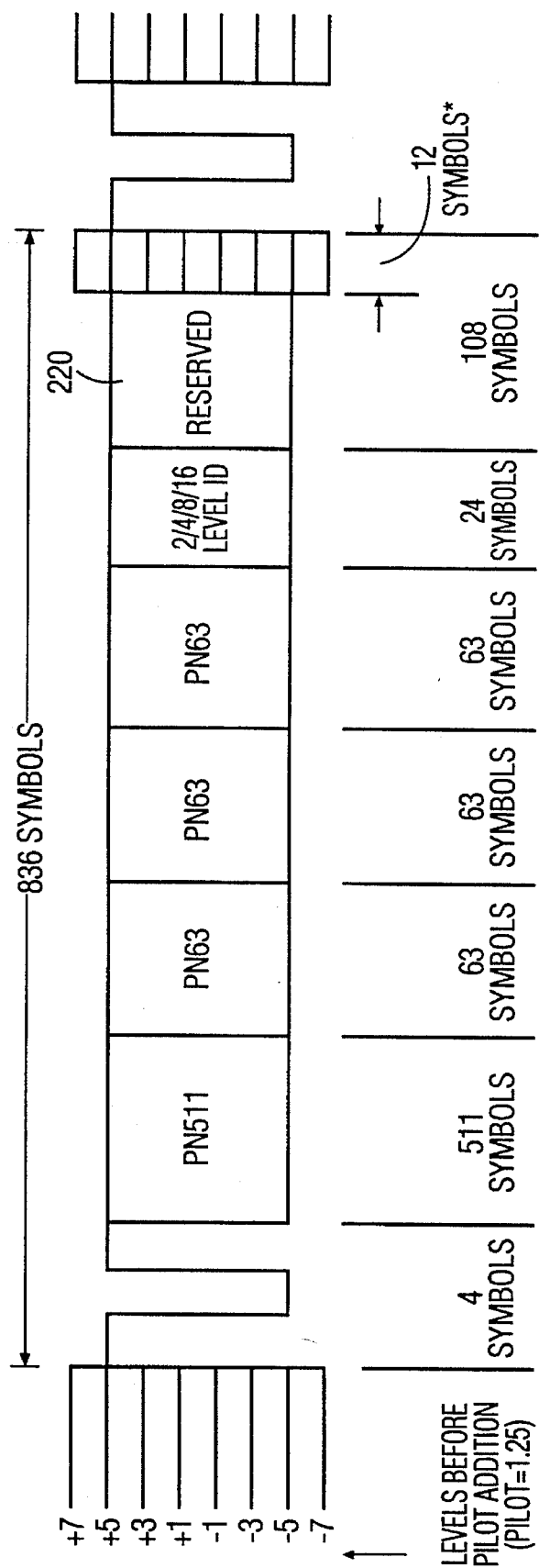
FIG. 9 describes the VSB data field sync for the VSB data frame of FIG. 8.

Of the 313 segments shown in FIG. 8, one of the segments is the VSB data field sync described in FIG. 9. It is therefore necessary to specify whether each "pair-segment" should be transmitted as 8VSB or 4VSB. There are 156 (=312/2) such "pair-segments".

As shown in FIG. 9, the VSB data field sync is sent every 313 segments and has some areas that are currently unused, for example, the locations specified by 220. The last 12 symbols which are duplicated are used because of the current implementation of the comb filter. Thus at least 120 such "pair-segments" can be specified using these 120 bits, where each bit can be 0 or 1 specifying either 8VSB or 4VSB modulation. On the other hand if each of the 120 symbols are represented as 4 bits, then twice as many "pair-segments" can be specified. Suffice it to say that the partial or complete information on how every "pair-segment" is coded can be made known to the receiver using the VSB data field sync. This approach is similar to that used in the case when the bi-rate capability was used to switch between 4VSB and 2VSB modulation as described in "Digital Spectrum Compatible—Technical Details".

Thus the "trellis-precoding" transmitter is able to simultaneously provide good performance in AWGN, combat co-channel NTSC interference and allow bi-rate control for applications which use both HDTV and data transmission.

Figure 10:
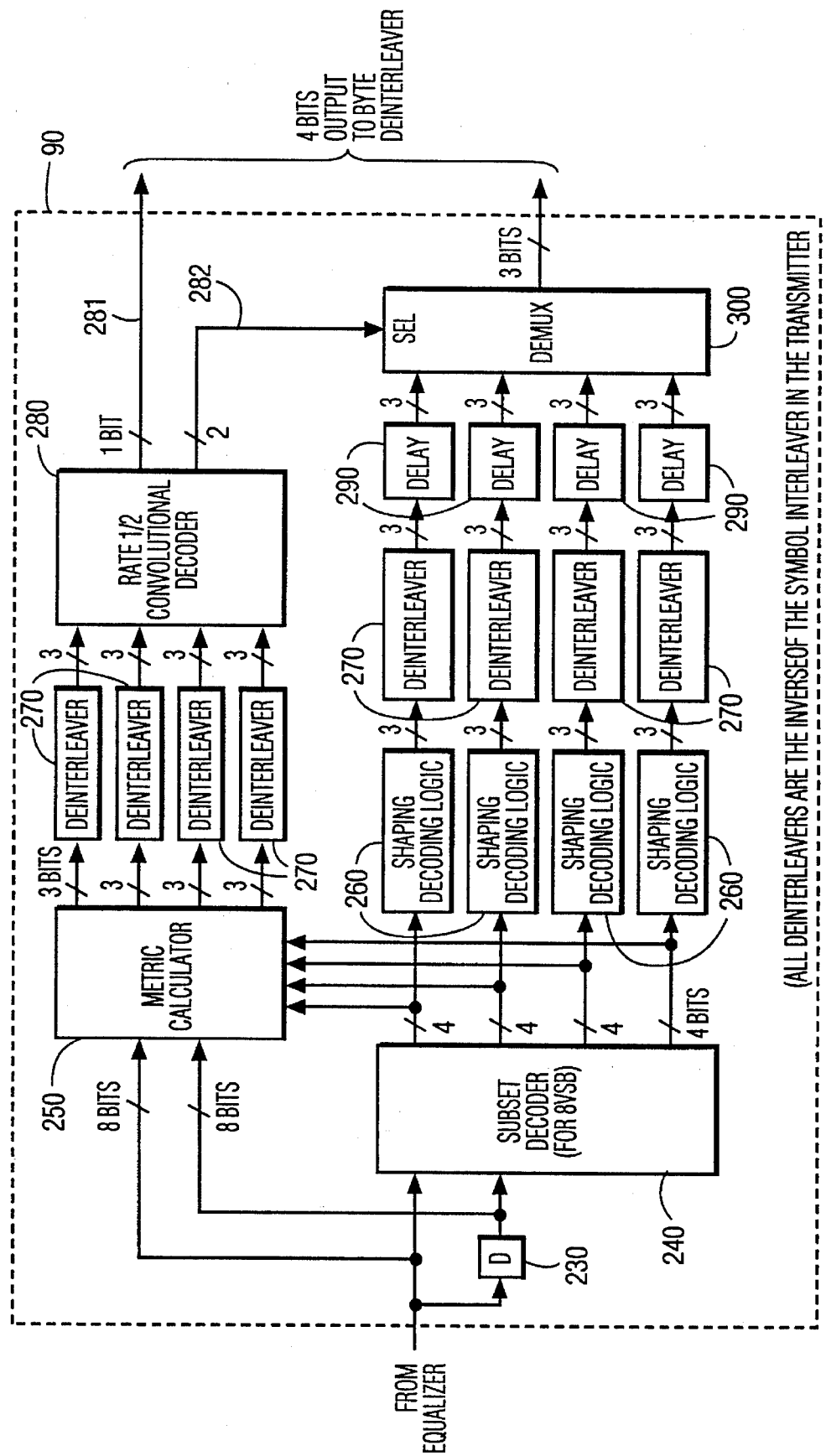
FIG. 10 describes a trellis decoder comprising the invention which includes a symbol deinterleaver and a shaping decoder for 8VSB modulation.

FIG. 10 describes the design of the trellis-decoder for the 8VSB system shown as module 90 in FIG. 2. Two successive outputs of the equalizer obtained using the delay element 230 are sent to the subset decoder 240 for 8VSB. This decoder outputs four bits each corresponding to the decoded constellation point in every subset, shown in FIG. 5. Each of these decoded subset points is passed through a shaping decoding logic module 260, which decodes the shaping operations performed in shaper module 135 discussed above. The output of the shaping logic module 260 is passed through the deinterleaver 270, which is the inverse of the symbol interleaver 130, and then through an appropriate delay 290 before being input to the demultiplexer 300 (shown as de-MUX in FIG. 10).

The output of the subset decoder 240 also goes to the metric calculator 250, which outputs 3-bit soft-decisions corresponding to every subset. A higher number of bits can also be used to provide better accuracy. These soft-decisions are then sent to the deinterleaver 270 which is the inverse of the symbol interleaver 130 and is then input to the rate ½ convolutional decoder 280. One output 281 of the convolutional decoder 280 is one bit which corresponds to the bit used for coding in the transmitter. Two additional bits are provided by at a second output 282 of the convolutional decoder 280 which select the subset decoder output (passed through the shaping decoding logic module 260, deinterleaver 270 and the delay 290) as shown in FIG. 10.

Figure 11:
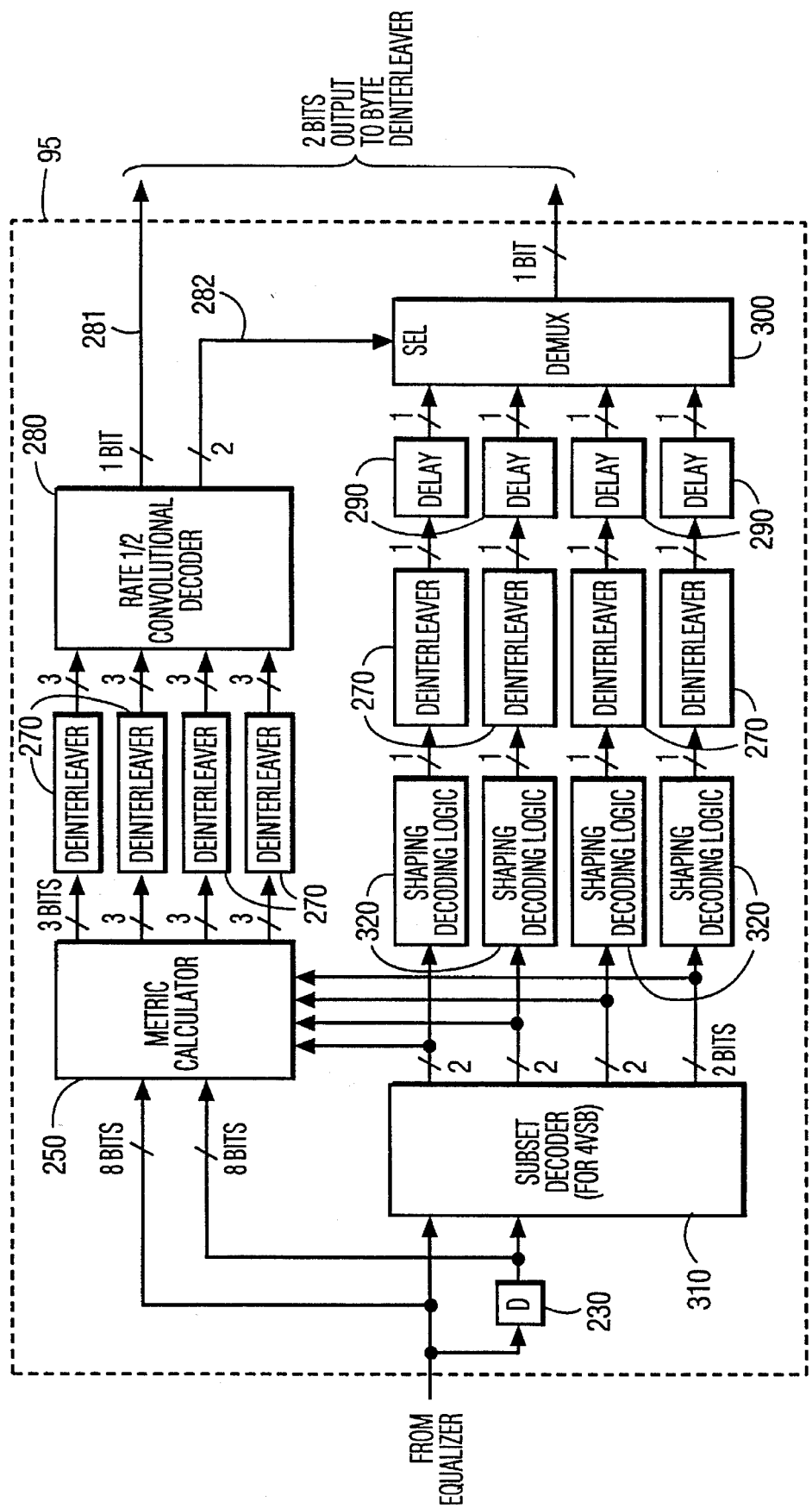
FIG. 11 describes a trellis decoder comprising the invention which includes a symbol deinterleaver and a shaping decoder for 4VSB modulation.

FIG. 11 describes the trellis decoder 95 for 4VSB which is similar to the trellis decoder 90 used for 8VSB, excepting for the subset decoder 310 (which performs its decoding based on the subsets described in FIG. 7) and the shaping decoder 320 (which is described below in conjunction with FIG. 12). In effect, even though two different circuits are shown for the 8VSB and the 4VSB trellis-decoders in FIG. 2, most of the functionality can be implemented as a single circuit.

The subset decoders 240 and 310, and the metric calculator 250 can use the minimum Euclidean distance as a metric, which is a ML (maximum-likelihood) metric as explained in "Principles of Digital Communication and Coding", McGraw Hill, 1979, authored by A. J. Viterbi and J. K. Omura, which is incorporated by reference herein. A MAP (maximum-a-posteriori) metric will have a better performance in the case of the "trellis-precoding" system. This is because the distribution of points at the output of the NTSC rejection filter approaches a Gaussian distribution.

Figure 12:
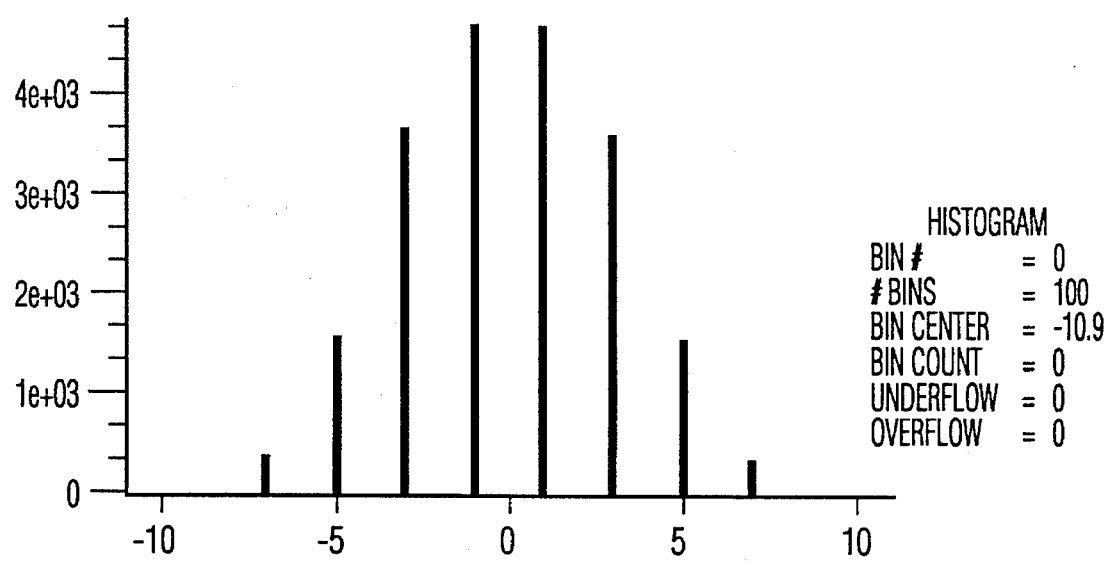
FIG. 12 illustrates the distribution of the signal points obtained using 8VSB after an interference rejection filter.

FIG. 12 graphically shows the distribution of 20000 signal points at the output of the NTSC rejection filter. Note that there are no values beyond +9 or −9. If X denotes the value of the constellation point, then it is possible to use a Gaussian distribution to approximate this distribution.

Consider a Gaussian distribution parameterized by 'C' and 'd' such that the probability of obtaining any point X in $\{-9,-7,-5,-3,-1,1,3,5,7,9\}$ is $C \exp\{-d|X|^2\}$. Since, more than two values of X are available from the simulated data in FIG. 12, it is possible to obtain the values of 'C' and 'd' by least-squares fit on all or part of the data as explained, for example, in "Matrix Computations," Johns Hopkins University Press, Baltimore, 1991, by G. H. Golub and C. F. V. Loan, which is incorporated by reference herein. Assuming that the data obtained for |X| in $\{1,3,5\}$ is accurate, the values obtained for 'C' and 'd' are 0.2527 and 0.0473 respectively. Assuming that the signal points are fitted on the Gaussian distribution as explained in the previous paragraph, it is then easy to show that the MAP criterion minimizes over all allowed values of Xn the value of $|Rn-Xn|^2+d\sigma^2|Xn|^2$, where Rn is the received signal corrupted by noise over the channel and $\sigma^2$ is related to the SNR (signal-to-noise-ratio), where a reasonable SNR is assumed. For the subset decoder, this criterion changes the slicer levels. The metric calculator then uses this criterion in the decoding of the rate ½ convolutional decoder.

Figure 13:
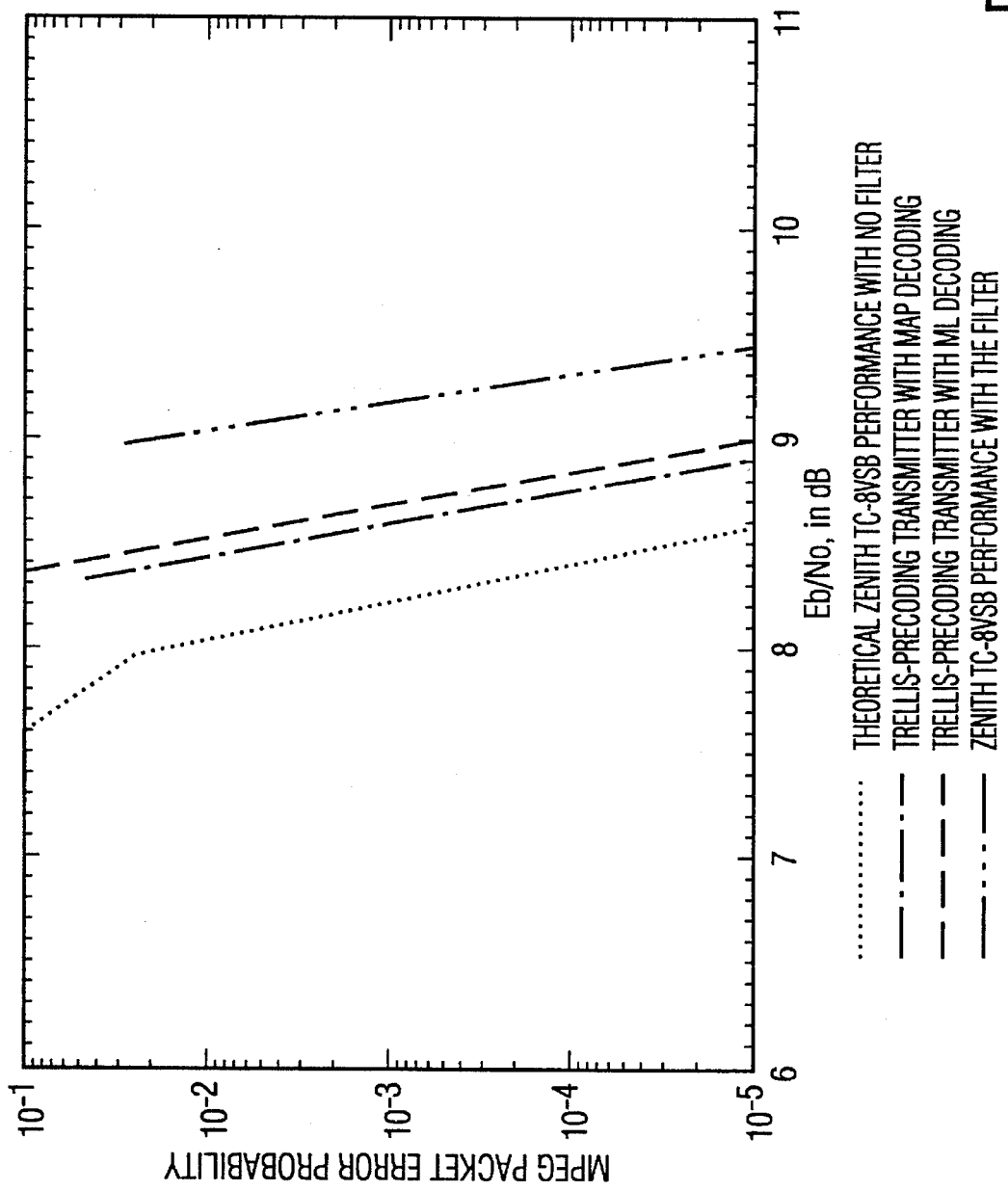
FIG. 13 illustrates the performance of the "trellis-precoding" of the invention for 8VSB in AWGN.

FIG. 13 graphically illustrates the performance of the "trellis-precoding" system in AWGN. The dotted line shows the performance of the Zenith code in AWGN. The dashed-dotted line shows the performance of the "trellis-precoding" system comprising the invention using the MAP criterion. This is only 0.32 dB worse than the performance of the Zenith code. About 0.3 dB of this loss is because of the noise enhancement due to the implementation of the rejection filter in the receiver. Note that if the ML metric is used, the performance of which is shown as a dashed-line, instead of the more optimal MAP decoder, the loss will be 0.42 dB which is only 0.1 dB worse than the MAP decoder. Also shown for comparison by a dash-3dots line is the performance of the Zenith trellis code with the 36-tap filter which is 0.9 dB worse than the performance of the Zenith code without the 36-tap filter.

Thus the "trellis-precoding" system with the associated decoding strategy comprising the invention has only 0.32 dB loss as compared to the Zenith system in AWGN, while providing upto 3.2 dB of improved performance when both co-channel NTSC and noise are present as was shown in the parent application. Also, the "trellis-precoding" system can be easily used for "bi-rate" transmission as shown.

When NTSC transmission is discontinued at a future time, the interference rejection filter can be easily removed at the receiver. The "trellis-precoding" system can then be changed to a "trellis-shaping" system as described in "Trellis Shaping", IEEE Transactions on Information Theory, vol. 38, no. 2, pp. 281–300, March 1992, authored by G. D. Forney and incorporated by reference herein. The information about this change can be easily sent via the data field sync described in FIG. 9 or by employing a higher level protocol.

I claim:

1. A television receiver comprising:
   means for receiving a transmitted signal having an encoded digital television signal component encoded using a subset limited trellis code, and a co-channel interference component;

means for flattening the frequency spectrum of the co-channel interference component to produce a filtered encoded digital television signal from the transmitted signal, said means for flattening including a prediction filter having predetermined coefficients; and decoder means for decoding the filtered encoded digital television signal.

2. The television receiver of claim 1, wherein said receiver uses maximum a posteriori (MAP) decoding.

3. A television receiver as claimed in claim 1, wherein the encoded digital television signal is a precoded encoded digital television signal, and said prediction filter operates on the transmitted signal.

4. A television receiver as claimed in claim 1, wherein said prediction filter further has a gain factor, and said coefficients are restricted to values in the set $\{-1,0,+1\}$.

5. A television receiver as claimed in claim 1, wherein said prediction filter operates on a difference signal, said difference signal being the difference between the transmitted signal and a past-decision signal.

6. A television receiver as claimed in claim 1, wherein said prediction filter operates on a difference signal, said difference signal being the difference between the transmitted signal delayed by a time interval and a past-decision signal delayed by said time interval.

7. A television receiver as claimed in claim 6, wherein the time interval is substantially equal to a NTSC line interval delay.

8. A television receiver comprising:

means for receiving a transmitted signal having an encoded digital television signal component encoded using a subset limited code which has had its symbols interleaved at a transmitter and a co-channel interference component;

means for flattening the frequency spectrum of the co-channel interference component to produce a filtered encoded digital television signal from the transmitted signal, said means for flattening including a prediction filter having predetermined coefficients;

symbol de-interleaving means for de-interleaving the symbols of the filtered encoded digital television signal to produce a de-interleaved digital television signal; and decoder means for decoding the de-interleaved digital television signal.

9. A television receiver as claimed in claim 8, wherein the encoded digital television signal is a precoded encoded digital television signal, and said prediction filter operates on the transmitted signal.

* * * * *